United States Patent
Cashman et al.

(10) Patent No.: US 10,037,624 B2
(45) Date of Patent: Jul. 31, 2018

(54) CALIBRATING OBJECT SHAPE

(71) Applicant: Microsoft Technology Licensing, LLC, Redmond, WA (US)

(72) Inventors: Thomas Joseph Cashman, Cambridge (GB); David Joseph New Tan, Garching bei Munich (DE); Jamie Daniel Joseph Shotton, Cambridge (GB); Andrew William Fitzgibbon, Cambridge (GB); Sameh Khamis, Seattle, WA (US); Jonathan James Taylor, London (GB); Toby Sharp, Cambridge (GB); Daniel Stefan Tarlow, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/982,568

(22) Filed: Dec. 29, 2015

(65) Prior Publication Data

US 2017/0186226 A1    Jun. 29, 2017

(51) Int. Cl.
*G06T 17/20* (2006.01)
*G06T 7/246* (2017.01)

(52) U.S. Cl.
CPC ............. *G06T 17/20* (2013.01); *G06T 7/251* (2017.01); *G06T 2200/04* (2013.01); *G06T 2207/30168* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,454,043 | A | 9/1995 | Freeman |
| 6,128,003 | A | 10/2000 | Smith et al. |
| 6,788,809 | B1 | 9/2004 | Grzeszczuk et al. |
| 7,702,130 | B2 | 4/2010 | Im et al. |
| 8,351,646 | B2 | 1/2013 | Fujimura et al. |
| 8,428,311 | B2 | 4/2013 | Dariush et al. |

(Continued)

OTHER PUBLICATIONS

Loper et al, "OpenDR: An Approximate Differentiable Renderer," European Conference on Computer Vision, ECCV 2014, Computer Vision—ECCV 2014 pp. 154-169.*

(Continued)

*Primary Examiner* — Maurice L McDowell, Jr.
*Assistant Examiner* — Donna J Ricks

(57) ABSTRACT

Examples describe an apparatus for calibrating a three dimensional (3D) mesh model of an articulated object. The articulated object is an instance of a specified object class. The apparatus comprises an input configured to receive captured sensor data depicting the object. The apparatus has a calibration engine configured to compute values of shape parameters of the 3D mesh model which indicate which member of the object class is depicted in the captured sensor data, in order to calibrate the 3D mesh model. The calibration engine is configured to compute the values of the shape parameters with an optimization process to find at least one potential local or global minimum of an energy function, the energy function expressing a degree of similarity between data rendered from the model and the received sensor data.

20 Claims, 5 Drawing Sheets

(56) References Cited

U.S. PATENT DOCUMENTS

| | | | |
|---|---|---|---|
| 8,610,723 B2* | 12/2013 | Lee | G06T 17/00 345/473 |
| 8,682,028 B2 | 3/2014 | Geiss | |
| 8,718,327 B2 | 5/2014 | Tong et al. | |
| 8,774,464 B2 | 7/2014 | Adhikari | |
| 8,781,221 B2 | 7/2014 | Ding et al. | |
| 8,797,328 B2 | 8/2014 | Corazza et al. | |
| 8,887,074 B2 | 11/2014 | Sheeler et al. | |
| 9,098,926 B2 | 8/2015 | Quan et al. | |
| 9,117,113 B2 | 8/2015 | Popa et al. | |
| 2012/0218262 A1 | 8/2012 | Yomdin et al. | |
| 2013/0107003 A1 | 5/2013 | Lim et al. | |
| 2013/0129230 A1* | 5/2013 | Shotton | G06K 9/00214 382/218 |
| 2014/0219550 A1* | 8/2014 | Popa | G06K 9/00342 382/154 |
| 2014/0232631 A1* | 8/2014 | Fleischmann | G06F 3/017 345/156 |
| 2015/0193975 A1 | 7/2015 | Corazza et al. | |
| 2015/0256815 A1 | 9/2015 | Grafulla-Gonzalez | |

OTHER PUBLICATIONS

"Leap Motion for Mac and PC", Retrieved on: Oct. 8, 2015, 5 pages Available at: https://www.leapmotion.com/product/desktop.

Melax, et al., "Dynamics Based 3D Skeletal Hand Tracking", In Proceedings of Graphics Interface, May 29, 2013, pp. 53-70.

Oikonomidis, et al., "Efficient Model-based 3D Tracking of Hand Articulations using Kinect", In Proceedings of British Machine Vision Conference, Sep. 2011, pp. 1-11.

Oikonomidis, et al., "Full DOF Tracking of a Hand Interacting with an Object by Modeling Occlusions and Physical Constraints", In Proceedings of 13th International Conference on Computer Vision, Nov. 6, 2011, 8 pages.

Oikonomidis, et al., "Tracking the Articulated Motion of Two Strongly Interacting Hands", In Proceedings of IEEE Conference on Computer Vision and Pattern Recognition, Jun. 2012, 8 pages.

Qian, et al., "Realtime and Robust Hand Tracking from Depth", In Proceedings of IEEE Conference on Computer Vision and Pattern Recognition, Jun. 24, 2014, 8 pages.

Shotton, et al., "Real-Time Human Pose Recognition in Parts from a Single Depth Image", In Proceedings of IEEE Conference on Computer Vision and Pattern Recognition, Jun. 2011, 8 pages.

Shotton, et al., "Decision Jungles: Compact and Rich Models for Classification", In Proceedings of Twenty-Seventh Annual Conference on Neural Information Processing Systems, Dec. 5, 2013, pp. 1-9.

Sridhar, et al., "Interactive markerless articulated hand motion tracking using RGB and depth data", In Proceedings of International Conference on Computer Vision, Dec. 3, 2013, 8 pages.

Stenger, et al., "Model-based 3D tracking of an articulated hand", In Proceedings of the IEEE Computer Society Conference on Computer Vision and Pattern Recognition, vol. 2 , Dec. 8, 2001, 6 pages.

Sun, et al., "Conditional regression forests for human pose estimation", In Proceedings of the IEEE Conference on Computer Vision and Pattern Recognition, Jun. 16, 2012, pp. 1-8.

Tang, et al., "Latent regression forest: Structured estimation of 3D articulated hand posture", In Proceedings of IEEE conference on Computer Vision and Pattern Recognition, Jun. 23, 2014, pp. 3786-3793.

Tang, et al., "Real-time articulated hand pose estimation using semi-supervised transductive regression forests", in Proceedings of the IEEE International Conference on Computer Vision, Dec. 3, 2013, pp. 3224-3231.

Taylor, et al., "The Vitruvian Manifold: Inferring dense correspondences for one-shot human pose estimation", In Proceedings of IEEE Conference on Computer Vision and Pattern Recognition, Jun. 16, 2012, pp. 103-110.

Tompson, et al., "Real-time continuous pose recovery of human hands using convolutional networks", in Journal of ACM Transactions on Graphics, vol. 33, Issue 5 , Aug. 2014, 10 pages.

Wang, et al., "6D hands: markerless hand-tracking for computer aided design", in Proceedings of the 24th annual ACM symposium on User interface software and technology, Oct. 16, 2011, pp. 549-557.

Wang, et al., "Real-time hand-tracking with a color glove", In Journal of ACM Transactions on Graphics, vol. 28, Issue 3, Aug. 2009, 8 pages.

Wang, et al., "Video-based hand manipulation capture through composite motion control", In Journal of ACM Transactions on Graphics, vol. 32, Issue 4, Jul. 2013, 14 pages.

Wu, et al., "View-independent recognition of hand postures", In Proceedings of IEEE Conference on Computer Vision and Pattern Recognition, vol. 2, Jun. 15, 2000, 7 pages.

Wu, et al., "Capturing natural hand articulation", In Proceedings of the Eighth IEEE International Conference on computer Vision, vol. 2, Jul. 7, 2001, pp. 426-432.

Xu, et al., "Efficient hand pose estimation from a single depth image", In Proceedings of IEEE International Conference on Computer Vision, Dec. 1, 2013, pp. 3456-3462.

Yuille, et al.,"Vision as Bayesian inference: analysis by synthesis?", In Proceedings of Trends in cognitive sciences, vol. 10, Issue 7, Jul. 2006, pp. 301-306.

Zhao et al., "Combining marker-based mocap and RGB-D camera for acquiring high-fidelity hand motion data", In Proceedings of the ACM SIGGRAPH/Eurographics Symposium on Computer Animation, Jul. 29, 2012, pp. 33-42.

Loper, et al., "OpenDR: An Approximate Differentiable Renderer", In Proceedings of the 13th European Conference on Computer Vision, Part VII, Sep. 6, 2014, pp. 1-16.

Bogo, et al., "Detailed Body Shape and Pose from RGB-D Sequences", In Proceedings of International Conference on Computer Vision, Oct. 25, 2015, 2 pages.

Kanzow, et al., "Levenberg—Marquardt Methods with Strong Local Convergence Properties for Solving Nonlinear Equations with Convex Constraints", In Journal of Computational and Applied Mathematics, vol. 172, Issue 2, Dec. 2004, pp. 375-397.

Khamis, et al., "Learning an Efficient Model of Hand Shape Variation from Depth Images", In Proceedings of IEEE conference on Computer Vision and Pattern Recognition, Jun. 7, 2015, 9 pages.

Makris, et al., "Model-based 3D Hand Tracking with on-line Hand Shape Adaptation", In Proceedings of 26th British Machine Vision Conference, Sep. 2015, pp. 1-12.

Oberweger, et al. "Hands Deep in Deep Learning for Hand Pose Estimation", In Proceedings of 20th Computer . Vision Winter Workshop, Feb. 9, 2015, 10 pages.

Oberweger, et al., "Training a Feedback Loop for Hand Pose Estimation", In Proceedings of International conference on Computer Vision, Retrieved on: Nov. 30, 2015, 9 pages.

Poier, et al., "Hybrid One-Shot 3D Hand Pose Estimation by Exploiting Uncertainties", In Proceedings of 26th British Machine Vision Conference, Sep. 2015, pp. 1-14.

Sharp, et al., "Accurate, Robust, and Flexible Real-time Hand Tracking", In Proceedings of the 33rd Annual ACM conference on Human Factors in Computing Systems, Apr. 18, 2015, pp. 3633-3642.

Sridhar, et al., "Fast and Robust Hand Tracking Using Detection-Guided Optimization", In Proceedings of Computer Vision and Pattern Recognition, Jun. 7, 2015, pp. 3213-3231.

Sridhar, et al., "Real-Time Hand Tracking Using a Sum of Anisotropic Gaussians Model", In Proceedings of 2nd International Conference on 3D Vision, vol. 1, Dec. 8, 2014, pp. 319-326.

Supancic, et al., "Depth-based Hand Pose Estimation: Data, Methods, and Challenges", In Proceedings of International Conference Computer Vision, Retrieved on: Nov. 30, 2015, 15 pages.

Tagliasacchi, et al., "Robust Articulated-ICP for Real-Time Hand Tracking", In Proceedings of Eurographics Symposium on Geometry Processing, vol. 34, Issue 5, Aug. 2015, 14 pages.

(56) References Cited

OTHER PUBLICATIONS

Tang, et al., "Opening the Black Box: Hierarchical Sampling Optimization for Estimating Human Hand Pose", In Proceedings of International Conference on Computer Vision, Retrieved on: Nov. 30, 2015, 9 pages.
Loper, et al., "SMPL: A Skinned Multi-Person Linear Model", In Proceedings of ACM SIGGRAPH, vol. 34, Issue 5, Nov. 2015, 15 pages.
Taylor, et al. "Tracking rigged smooth-surface models of articulated objects" US patent application filed on Dec. 29, 2015, 20 pages.
Agarwal, et al., "Ceres Solver", Retrieved on: Oct. 7, 2015, 2 pages. Available at: http://ceres-solver.org/.
Igarashi, et al., "As-Rigid-As-Possible Shape Manipulation ", In Journal ACM Transactions on Graphics, vol. 24, Issue 3, Jul. 31, 2005, pp. 1134-1141.
Izadi, et al., "KinectFusion: Real-time 3D Reconstruction and Interaction Using a Moving Depth Camera", In Proceedings of the 24th annual ACM symposium on User interface software and technology, Oct. 16, 2011, pp. 559-568.
Jacobson, et al., "Stretchable and Twistable Bones for Skeletal Shape Deformation", In Journal ACM Transactions on Graphics, vol. 30, Issue 6, Dec. 2011, 8 pages.
Li, et al., "Robust Single-View Geometry and Motion Reconstruction", In Journal ACM Transactions on Graphics, vol. 28, issue 5, Dec. 17, 2009, 10 pages.
Li, et al., "3D Self-Portraits", In Journal ACM Transactions on Graphics, vol. 32, Issue 6, Nov. 2013, 9 pages.
Loop, et al., "Approximating Catmull-Clark Subdivision Surfaces with Bicubic Patches", In Journal ACM Transactions on Graphics, vol. 27, Issue 1, Mar. 2008, 11 pages.
Newcombe, et al., "DTAM: Dense Tracking and Mapping in Real-Time", In Proceedings of IEEE International conference on Computer Vision, Nov. 6, 2011, pp. 2320-2327.
Sorkine, et al., "As-Rigid-As-Possible Surface Modeling", in Proceedings of the fifth Eurographics symposium on Geometry processing, Jul. 4, 2007, 8 pages.
Straka, et al., "Simultaneous Shape and Pose Adaption of Articulated Models using Linear Optimization", in Proceedings of the 12th European conference on Computer Vision—vol. Part I, Oct. 27, 2012, pp. 1-14.
Sumner, et al., "Embedded Deformation for Shape Manipulation", In Journal of ACM Transactions on Graphics, vol. 26 Issue 3, Jul. 2007, 8 pages.
Triggs, et al., "Bundle Adjustment—A Modern Synthesis", In Proceedings of International Workshop on Vision Algorithms: Theory and Practice, Sep. 2000, pp. 1-71.
Wand, et al., "Efficient Reconstruction of Nonrigid Shape and Motion from Real-Time 3D Scanner Data", In Journal of ACM Transactions on Graphics, vol. 28, Issue 2, Apr. 2009, 15 pages.
Weiss, et al., "Home 3D Body Scans from Noisy Image and Range Data", In Proceedings of IEEE International conference on Computer Vision, Nov. 6, 2011, pp. 1951-1958.
Khamis, et al., "Learning an Efficient Model of Hand Shape Variation from Depth Images", In Proceedings of computer Vision and Pattern Recognition, Jun. 7, 2015, 9 pages.
Sharpy, et al., "Accurate, Robust, and Flexible Real-time Hand Tracking", In Proceedings of the 33rd Annual ACM conference on Human Factors in Computing Systems, Apr. 18, 2015, 10 pages.
Wang, et al., "An Adjustable Polygon Connecting Method for 3D Mesh Refinement", In Proceedings of International conference on Virtual Reality and Visualization, Aug. 30, 2014, pp. 202-207.
Schmidt, et al., "DART: Dense Articulated Real-Time Tracking", In Journal of Autonomous Robots, vol. 39, Issue 3, Oct. 2015, 9 pages.
Dewaele, et al., "Hand Motion from 3D Point Trajectories and a Smooth Surface Model", In Proceedings of 8th European Conference on Computer Vision, May 11, 2004, pp. 495-507.
Xu, et al., "Estimate Hand Poses Efficiently from Single Depth Images", In International Journal of Computer Vision, Apr. 19, 2015, 25 pages.

"How to apply Subdivision Surface for fluent bone animation", Published on: Apr. 29, 2014, 3 pages. Available at: http://blender.stackexchange.com/questions/8341/how-to-apply-subdivision-surface-for-fluent-bone-animation.
"International Search Report and Written Opinion Issued in PCT Application No. PCT/US2016/067641" dated Mar. 31, 2017, 12 Pages.
Tan, et al., "Fits Like a Glove: Rapid and Reliable Hand Shape Personalization", In Proceedings of the IEEE conference on Computer Vision and Pattern Recognition, Jun. 27, 2016, pp. 5610-5619.
Lin, et al., "Human Hand Gesture Recognition using a Convolution Neural Network", In Proceedings of International conference on Automation Science and Engineering, Aug. 18, 2014, pp. 1038-1043.
Suryanarayan, et al., "Dynamic Hand Pose Recognition using Depth Data", In Proceedings of 20th International conference on Pattern Recognition, Aug. 23, 2010, pp. 3105-3108.
Vicente, et al., "GPU-Enabled Particle Based Optimization for Robotic-Hand Pose Estimation and Self-Calibration ", In Proceedings of IEEE International Conference on Autonomous Robot Systems and Competitions, Apr. 8, 2015, pp. 3-8.
Bergh, et al., "Combining RGB and ToF Cameras for Real-time 3D Hand Gesture Interaction", In Proceedings of IEEE Workshop on Applications of Computer Vision, Jan. 5, 2011, 7 pages.
Keskin, et al., "Real Time Hand Pose Estimation using Depth Sensors", In Proceedings of IEEE International conference on Computer Vision Workshops, Nov. 6, 2011, pp. 1228-1234.
Wang, et al., "Data-driven Glove Calibration for Hand Motion Capture", In Proceedings of the 12th ACM SIGGRAPH/Eurographics Symposium on Computer Animation, Jul. 19, 2013, 10 pages.
Marin, et al., "Hand Gesture Recognition with Jointly Calibrated Leap Motion and Depth Sensor", In Journal of Multimedia Tools and Applications, Feb. 13, 2015, 11 pages.
Ren, et al., "Depth Camera Based Hand Gesture Recognition and its Applications in Human-Computer-Interaction", In Proceedings of 8th International Conference on Information, Communications and Signal Processing, Dec. 13, 2011, 5 pages.
Tang, Matthew, "Recognizing Hand Gestures with Microsoft's Kinect", In Technical Report, Mar. 2011, 12 pages.
Mo, et al., Real-time Hand Pose Recognition Using Low-Resolution Depth Images, In Proceedings of the IEEE Computer Society Conference on Computer Vision and Pattern Recognition, vol. 2, Jun. 17, 2006, 7 pages.
Fanello, et al., "Learning to be a Depth Camera for Close-Range Human Capture and Interaction", In Journal of ACM Transactions on Graphics, vol. 33, Issue 4, Jul. 2014, 11 pages.
Albrecht, et al., "Construction and Animation of Anatomically Based Human Hand Models", In Proceedings of the ACM SIGGRAPH/Eurographics symposium on Computer animation, Jul. 26, 2003, pp. 98-109.
Allen, et al., "Articulated Body Deformation from Range Scan Data", In Journal of ACM Transactions on Graphics, vol. 21, Issue 3, Jul. 2002, pp. 612-619.
Allen, et al., "The space of Human Body Shapes: Reconstruction and Parameterization from Range Scans", In Journal of ACM Transactions on Graphics, vol. 22, Issue 3, Jul. 2003, pp. 587-594.
Anguelov, et al., "SCAPE: Shape Completion and Animation of People", In Journal of ACM Transactions on Graphics, vol. 24, Issue 3, Jul. 2005, pp. 408-416.
Ballan, et al., "Motion Capture of Hands in Action Using Discriminative Salient Points", In Proceedings of 12th European Conference on Computer Vision, Oct. 7, 2012, pp. 1-14.
Blanz, et al., "A Morphable Model for the Synthesis of 3D Faces", In Proceedings of the 26th annual conference on Computer graphics and interactive techniques, Jul. 1999, pp. 187-194.
Alexander, et al., "Proportions of Hand Segments", In International Journal of Morphology, vol. 28, Issue 3, Sep. 2010, pp. 755-758.
Cashman, et al., "What Shape Are Dolphins? Building 3D Morphable Models from 2D Images", In Proceedings of IEEE Transactions on Pattern Analysis and Machine Intelligence, vol. 35, Issue 1, Jan. 2013, pp. 232-244.

(56) References Cited

OTHER PUBLICATIONS

Chen, et al., "Tensor-Based Human Body Modeling", in Proceedings of the IEEE Conference on Computer Vision and Pattern Recognition, Jun. 2013, pp. 105-112.
Gorce, et al., "Model-Based Hand Tracking with Texture, Shading and Self-Occlusions", In Proceedings of IEEE conference on Computer Vision and Pattern Recognition, Jun. 23, 2008, 8 pages.
Freifeld, et al., "Lie Bodies: A Manifold Representation of 3D Human Shape", In Proceedings of the 12th European aonference on Computer Vision, Oct. 7, 2012, pp. 1-14.
Hasler, et al., "A Statistical Model of Human Pose and Body Shape", In Journals of Computer Graphics Forum, vol. 28, No. 2, Apr. 2009, pp. 1-10.
Helten, et al., "Personalization and Evaluation of a Real-time Depth-based Full Body Tracker", In Proceedings of the International Conference on 3D Vision, Jun. 29, 2013, 8 pages.
Hirshberg, et al., "Coregistration: Simultaneous Alignment and Modeling of Articulated 3D Shape", In Proceedings pf the 12th European conference on Computer Vision, Oct. 7, 2012, pp. 1-14.
Li, et al., "Global Correspondence Optimization for Non-Rigid Registration of Depth Scans", In Proceedings of the Symposium on Geometry Processing, Jul. 2008, 10 pages.
"Ceres Solver", Retrieved on: Oct. 7, 2015, 2 pages Available at: http://ceres-solver.org/.
Liao, et al., "Modeling Deformable Objects from a Single Depth Camera", In Proceedings of IEEE 12th International Conference on Computer Vision , Sep. 29, 2009, pp. 167-174.
Loop, Charles Teorell, "Smooth Subdivision Surfaces Based on Triangles", In Master Thesis, Aug., 1987, 74 pages.
Neumann, et al., "Capture and Statistical Modeling of Arm-Muscle Deformations", In Proceedings of Computer Graphics Forum, vol. 32, Issue 2, May 6, 2013, pp. 285-294.
Rhee, et al., "Human Hand Modeling from Surface Anatomy", In Proceedings of the symposium on Interactive 3D graphics and games, Mar. 14, 2006, pp. 27-34.
"Poser 3D Animation Software", Retrieved on: Oct. 8, 2015, 2 pages Available at: http://my.smithmicro.com/poser-3d-animation-software.html.
Stoll, et al., "Template Deformation for Point Cloud Fitting", In Proceedings of Symposium on Point Based Graphics, Jul. 2006, 8 pages.
Taylor, et al., "User-Specific Hand Modeling from Monocular Depth Sequences", In Proceedings of IEEE conference on Computer Vision and Pattern Recognition, Jun. 23, 2014, pp. 1-8.
Tsoli, et al., "Breathing Life into Shape: Capturing, Modeling and Animating 3D Human Breathing", In Journals of ACM Transactions on Graphics, vol. 33, Issue 4, Jul. 27, 2014, 11 pages.
Weis, et al., "Home 3D Body Scans from Noisy Image and Range Data", In Proceedings of IEEE International conference on Computer Vision, Nov. 6, 2011, pp. 1951-1958.
Athitsos, et al., "Estimating 3D Hand Pose from a Cluttered Image", In Proceedings of IEEE Computer Vision and Pattern Recognition, Jun. 2003, 8 pages.
Bray, et al., "Smart Particle Filtering for 3D Hand Tracking", In Proceedings of Sixth IEEE International Conference on Automatic Face and Gesture Recognition, May 17, 2004, 6 pages.
Criminisi, et al., "Decision Forests for Computer Vision and Medical Image Analysis", In Proceedings of Springer, Jan. 31, 2013, 4 pages.
Gorce, et al., "Model-Based 3D Hand Pose Estimation from Monocular Video", In Journal of IEEE Transactions on Pattern Analysis and Machine Intelligence, vol. 33, Issue 9, Sep. 2011, pp. 1793-1805.
Dipietro, et al., "A Survey of Glove-Based Systems and Their Applications", In Journal of IEEE Transactions on Systems, Man, and Cybernetics, Part C: Applications and Reviews, vol. 38, Issue 4, Jul. 2008, pp. 461-482.
Erol, et al., "Vision-based Hand Pose Estimation: A Review", In Journal of Computer Vision and Image Understanding, vol. 108, Issue 1-2, Oct. 2007, pp. 52-73.
Girshick, et al., "Efficient Regression of General-Activity Human Poses from Depth Images", In Proceedings of International Conference on Computer Vision, Nov. 2011, 8 pages.
Heap, et al. "Towards 3D Hand Tracking using a Deformable Model", In Proceedings of Second International conference on Automatic Face and Gesture Recognition, Oct. 14, 1996, 6 pages.
Juang, Chia-Feng, "A Hybrid of Genetic Algorithm and Particle Swarm Optimization for Recurrent Network Design", In Journal of IEEE Transactions on Systems, Man, and Cybernetics, Part B: Cybernetics, vol. 34, Issue 2, Apr. 2004, pp. 997-1006.
Keskin, et al., "Hand Pose Estimation and Hand Shape Classification Using Multi-layered Randomized Decision orests", In Proceedings of 12th European Conference on Computer Vision, Oct. 7, 2012, 1 page.
Kim, et al., "Digits: Freehand 3D Interactions Anywhere Using a Wrist-Worn Gloveless Sensor", In Proceedings of 25th Annual ACM Symposium on User Interface Software and Technology, Oct. 7, 2012, pp. 167-176.
Krupka, et al., "Discriminative Ferns Ensemble for Hand Pose Recognition", In Proceedings of IEEE Conference on computer Vision and Pattern Recognition, Jun. 24, 2014, 8 pages.
"International Preliminary Report on Patentability Issued in PCT Application No. PCT/US2016/067641", dated Oct. 31, 2017, 10 Pages.
"Second Written Opinion Issued in PCT Application No. PCT/US2016/067641", dated Jul. 28, 2017, 4 Pages.

\* cited by examiner

CALIBRATING OBJECT SHAPE

BACKGROUND

Articulated objects such as the human body, human hand, a laptop computer, a robot, an animal, or other articulated object, are challenging to track with high levels of accuracy and speed from captured sensor data such as video images, depth camera images and other sensor data. Tracking such articulated objects is complex for many reasons, including that the object being tracked has its own particular shape and this shape varies between different objects in the same class of objects. For example, a human hand is a class of objects and within that class, there are many different individual human hands with different shapes. A laptop computer is also a class of objects and within the class are lots of different designs of laptop computers having different shapes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Examples describe an apparatus for calibrating a three dimensional (3D) mesh model of an articulated object. The articulated object is an instance of a specified object class. The apparatus comprises an input configured to receive captured sensor data depicting the object. The apparatus has a calibration engine configured to compute values of shape parameters of the 3D mesh model which indicate which member of the object class is depicted in the captured sensor data, in order to calibrate the 3D mesh model. The calibration engine is configured to compute the values of the shape parameters with an optimization process to find at least one potential local or global minimum of an energy function, the energy function expressing a degree of similarity between data rendered from the model and the received sensor data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

A fast process for calibrating shape of a three dimensional (3D) mesh model of an articulated object is described. The calibrated 3D mesh model is used to track the object more accurately than if no calibration is used. Sensor data depicting an instance of the articulated object is captured. The process uses an energy function which takes shape parameters as input. The energy function expresses a degree of similarity between data rendered from the model and the received sensor data. The degree of similarity is measured using a similarity metric as described in more detail below. Using this type of energy function enables accurate shape parameters to be computed. However, the energy function does not respond smoothly to changes in the parameters and despite this, it has been found that it is possible to successfully optimize the energy function in practical time scales. Once the calibration results are available the shape parametersare used, in some examples, to update a 3D model of the articulated object to make the model "individualized" rather than being a model which is generic to a class of objects. A tracker which computes pose of the object from the captured sensor data achieves results with improved accuracy when it uses the individualized model.

Figure 1:
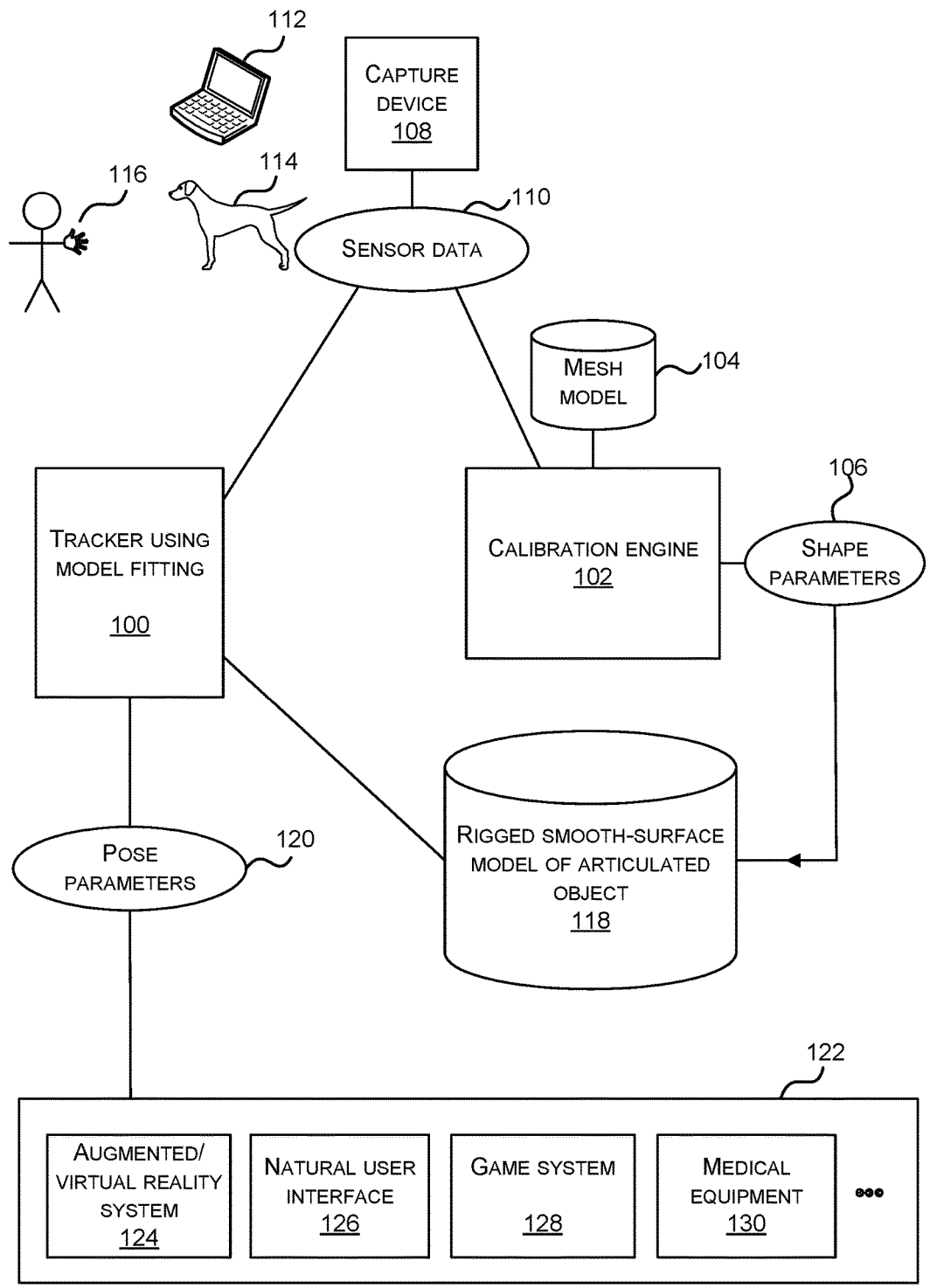
FIG. 1 is a schematic diagram of a calibration engine and a tracker.

FIG. 1 is a schematic diagram of a calibration engine 102 and a tracker 100. A capture device 108 captures sensor data depicting an articulated object. An articulated object is any animate or inanimate object with one or more joints. A non-exhaustive list of examples of an articulated object is: human body, human hand, human head and shoulders, animal body, laptop computer, robot. The sensor data is any sensor data depicting the object such as a color image, a medical image, a depth image, a 3D point cloud, a video.

The calibration engine 102 has access to a 3D mesh model 104 for a class of the articulated object and it computes values of shape parameters 106 of the mesh model 104 from the captured data 110. The values of the shape parameters calibrate the mesh model and/or a related smooth-surface model 118. In this way, an individualized 3D model is obtained which is tailored to the particular object depicted in the sensor data as opposed to representing the whole class of objects. The calibration engine also computes pose parameters of the mesh model.

A 3D mesh model is a representation of an object where the model surface is formed from polygons such as triangles, hexagons or other polygons. In some examples a 3D mesh model has polygon adjacency information but this is not essential. In some examples the 3D mesh model is rigged in that it has an associated skeleton or other representation of one or more joints of the articulated object.

In some examples the 3D mesh model is related to a rigged smooth-surface model 118 of the articulated object. In this case the pose parameters and shape parameters are shared by the 3D mesh model and the rigged smooth-surface model. In some examples, the rigged smooth-surface model is calculated from the mesh model 104 by repeatedly subdividing the polygons of the mesh. In the limit of repeatedly subdividing the polygons of the mesh a smooth-surface is obtained. However, in practice a closed-form solution may be used to compute the smooth limit surface so that it is not necessary to infinitely subdivide the polygons of the mesh. A defining function is specified, in some examples, which computes a 3D point on the smooth surface model given an index of a 3D point on the mesh model and values of the pose parameters.

In some examples there is a tracker 100 which uses the captured sensor data 110 to compute pose parameters 120 of a rigged smooth-surface model of the articulated object 118. The tracker uses model fitting to compute the pose parameters 120 as described in more detail later in this document. The pose parameters are provided as input to a downstream system 122 such as an augmented or virtual reality system 124, a natural user interface 126, a game system 128, medical equipment 130 or others.

The calibration engine 102 is located either local to the capture device 108 or remote from the capture device 108. The calibration engine 102 has an input such as a wired communications port or a wireless receiver, which receives data captured by the capture device 108. The tracker 100 is integral with the calibration engine 102 in some examples. In some examples the tracker 100 is remote from the calibration engine 102 and these entities communicate with one another over a wired or wireless communications link.

In some examples, the functionality of the calibration engine and tracker is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
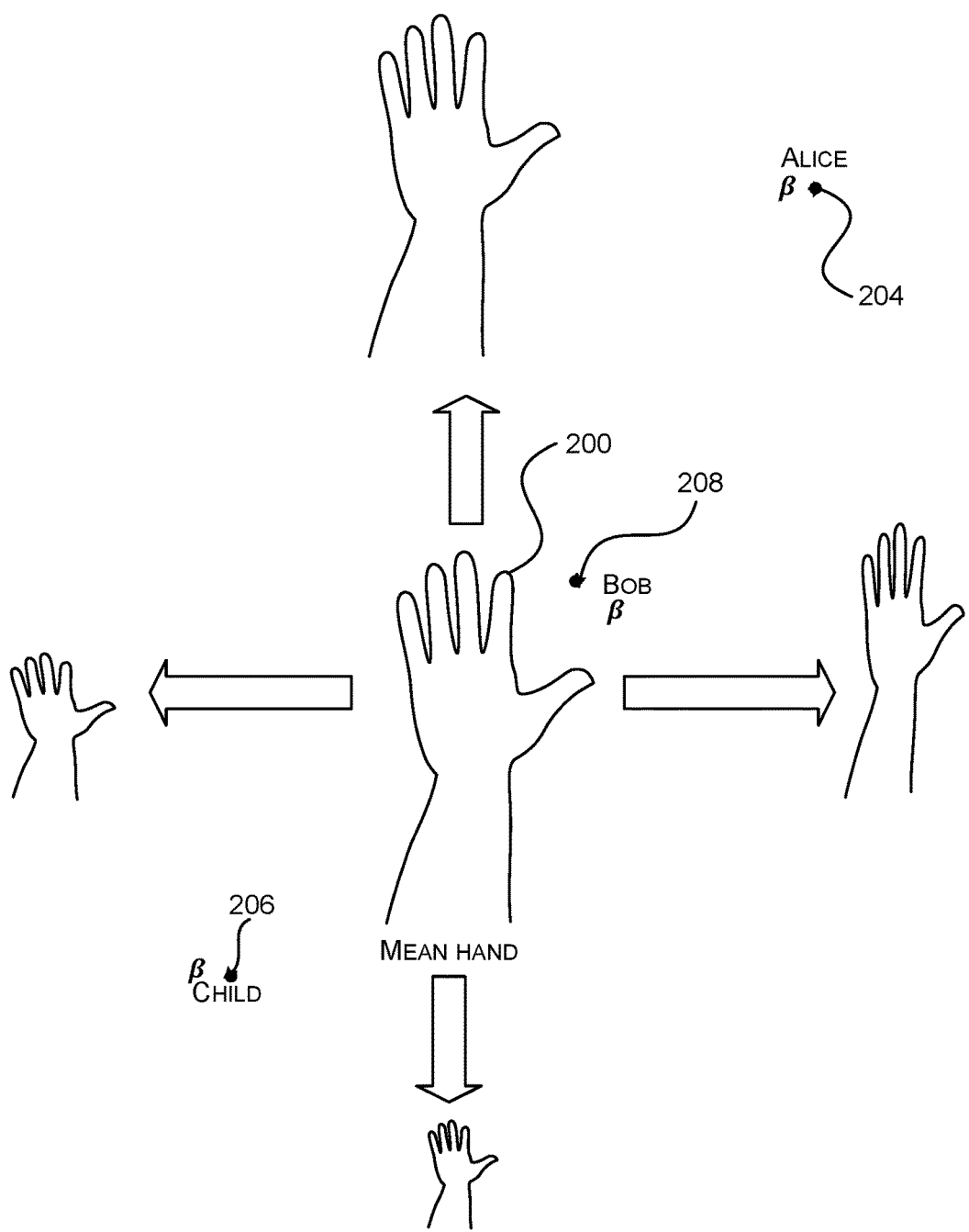
FIG. 2 is a schematic diagram of a hand shape space.

FIG. 2 is a schematic diagram of a hand shape space. Although this example is for a hand shape space it is also applicable to other types of articulated object simply by replacing the hand representations by representations of the object class concerned. A generic shape, in the example of FIG. 2 this is a generic hand shape 200, is at a nominated position in the shape space and values of shape parameters β specify a location in the shape space representing a particular object shape (hand shape in the example of FIG. 2). In the example of FIG. 2 three individual hand shapes are indicated by points 204, 206, 208.

The calibration engine 102 receives 300 the captured data 110 and optionally extracts 302 a region of interest from the captured data 110. For example, the region of interest comprises captured data points depicting the object and seeks to exclude captured data points depicting other surfaces in the environment. In some examples, the region of interest is extracted using a machine learning system which has been trained using pairs of captured data and labeled regions of interest to directly derive the region of interest from the captured data. In some examples, the region of interest is extracted in other ways such as by analyzing content of the captured data.

The calibration engine 304 accesses a 3D mesh model which has shape and pose parameters. The 3D mesh model is of a class of articulated objects and the shape and pose parameters are initially set to default values so that the 3D mesh model represents a neutral pose and a generic shape. However, it is not essential to set the shape and pose parameters to initial default values in this way. In some examples the mesh model comprises a combination of an articulated skeleton and a mapping from shape parameters to mesh vertices.

In some examples the calibration engine optionally initializes the pose parameter values using values computed from a previous instance of the captured data, or from values computed from another source. However, this is not essential.

The calibration engine minimizes 306 an energy function that expresses a degree of similarity between data rendered from the mesh model and the received sensor data. The degree of similarity is measured using a similarity metric. Various different similarity metrics may be used such as a sum of squared differences, a sum of absolute differences, or other similarity metrics. In some examples, the energy function is jointly optimized over the shape parameters (denoted by the symbol θ) and the pose parameters (denoted by the symbol β) to maximize the alignment of the mesh model and the captured data. For example, the energy function is given as follows:

$$E_{gold}(\theta, \beta) = \frac{1}{WH} \sum_{i=1}^{W} \sum_{j=1}^{H} r_{ij}(\theta, \beta)^2$$

With the residual $r_{ij}(\theta,\beta)$ for pixel (i,j) defined as a weighted difference between a captured sensor value at pixel i,j minus the value of pixel i,j in the rendered sensor data. The symbol W denotes the width in pixels of the rendered image and the symbol H denotes the height in pixels of the rendered sensor data.

In some examples, the energy function is expressed in words as:

an energy over pose parameters and shape parameters of a 3D mesh model of an articulated object is equal to an average of the sum of squared differences between captured sensor data points and corresponding data points rendered from the model.

However, it is not straightforward to optimize an energy function of this form because the energy function is not smooth and contains discontinuities in its derivatives. Also, it is not apparent that optimizing this form of energy function would give workable calibration results. It is found in practice that the above energy function is only piecewise continuous as moving occlusion boundaries cause jumps in the value of rendered data points.

Good results (such as those described below) are found where the calibration engine is configured to compute the optimization process by using information from derivatives of the energy function. The optimization process is optionally achieved using a gradient-based optimizer such as the Levenberg-Marquardt optimizer, gradient descent methods, the conjugate gradient method and others. A gradient-based optimizer is one which searches an energy function using search directions that are defined using the gradient of the function at the current point. Gradient-based optimizers require the derivatives of the energy function, and some require the use of Jacobian matrices to represent these derivatives for parts of the energy function. A Jacobian matrix is a matrix of all first-order partial derivatives of a vector valued function.

The calibration engine is configured to compute the optimization process using finite differences in some examples. Finite differences are discretization methods for computing derivatives by approximating them with difference equations. In difference equations, finite differences approximate the derivatives.

In some examples the calibration engine is configured to use a differentiable renderer. That is, the derivatives of the energy function which are to be computed to search for a minimum of the energy function, are computed using a renderer of a graphics processing unit as described in more detail below. This contributes to enabling minimization of the energy function in practical time scales.

In some examples the energy function includes a pose prior energy. The pose prior energy is a term in the energy function which provides constraints on the values of the pose parameters. For example, to avoid unnatural and/or impossible poses from being computed. It is found that use of a pose prior is beneficial where there are occlusions in the captured data. For example, in self-occluded poses during hand tracking where the fingers or forearm are not visible in the rendered image.

In some examples the calibration engine is configured to minimize the energy function where the energy function includes a sum of squared differences penalty. It has been found that using a sum of squared differences penalty (also referred to as an L2 penalty) gives improved results as compared with using a L1 penalty where an L1 penalty is a sum of absolute differences.

In various examples the mesh model includes information about adjacency of mesh faces. However, this is not essential. In some examples the mesh model does not have information about adjacency of mesh faces.

Once the calibration engine has computed the values of the shape parameters it sends 308 those to the tracker.

The tracker receives the shape parameters and applies them to the rigged 3D mesh model and/or the related smooth-surface model. The tracker then proceeds to fit captured sensor data, to the calibrated rigged model.

Calibration, where it occurs, is in an online mode or in an offline mode. In the online mode tracking is ongoing whilst the calibration takes place. In the offline mode tracking is not occurring whilst the calibration takes place.

Figure 4A:
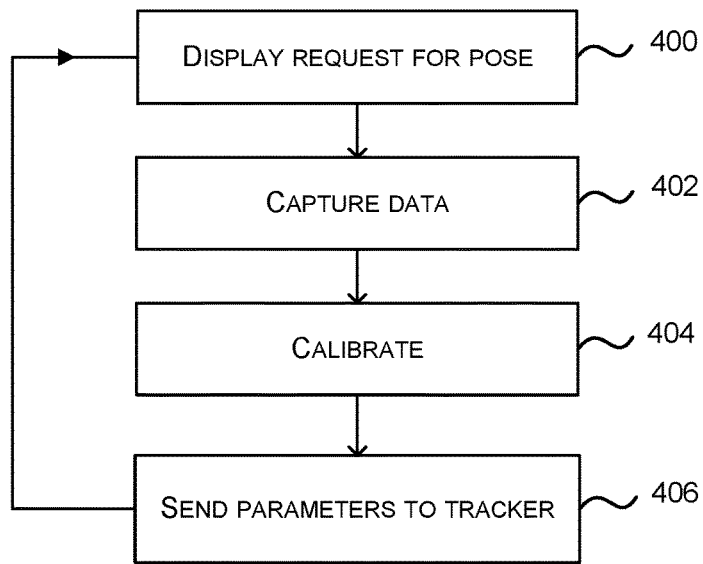
FIG. 4a is a flow diagram of a method of offline calibration.
Figure 4:
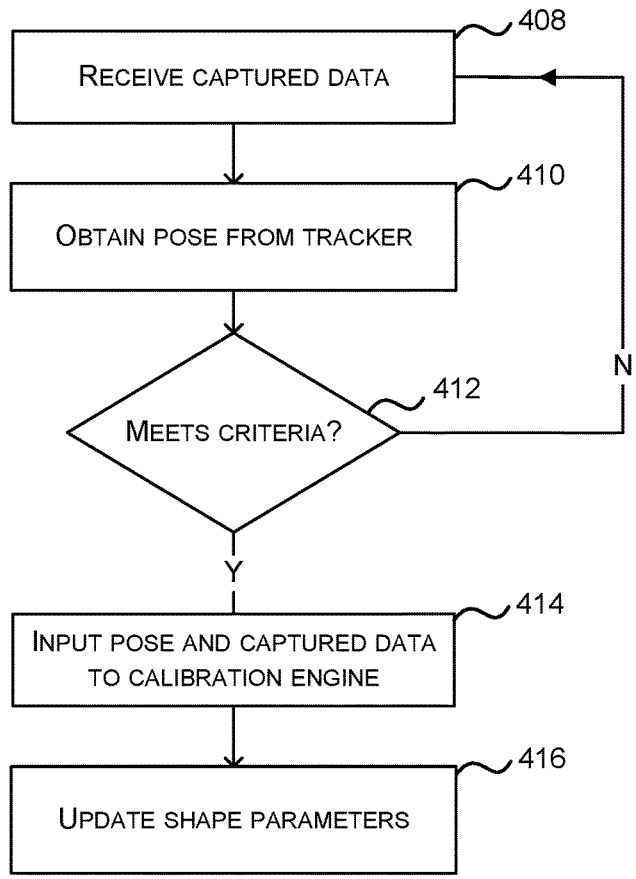
FIG. 4 is a flow diagram of a method of online calibration.

FIG. 4 has an example of a method of offline calibration. The calibration engine triggers a display 400 at a display device requesting a pose. For example, the display shows a mesh model in a particular pose and ask the user to try to copy the pose of the mesh model or simply to keep still. Data is captured 402 using the capture device and used to calibrate 404 the mesh model as described above. The computed shape parameter values (and optionally the computed pose parameter values) are sent to the tracker 406. This process is optionally repeated for several different poses in order that the calibration engine is able to compute accurate shape parameters; in this case, the calibration operation jointly infers a shared set of shape parameters across the previously captured data for the different poses. However, it is possible to use only a single instance of the captured data and still obtain working results.

FIG. 4 also has an example of a method of online calibration which occurs during operation of the tracker. The calibration engine receives captured data 408 and obtains computed pose parameters from the tracker 410 calculated from the captured data 408. The calibration engine checks if criteria are met 412 (in order to decide whether to carry out calibration). For example, the criteria may be whether a specified time interval has elapsed since the last calibration, whether a specified number of instances of captured data have been captured since the last calibration, whether the accuracy of the tracking has fallen below a specified level, whether user input has been received or other criteria. When the criteria are met the pose parameter values and the captured data are input 414 to the calibration engine. The calibration engine initializes the optimization process using the pose parameter values and searches for a solution. When it finds a solution it outputs the shape parameter values and these are used to update 416 the shape parameter values of the 3D mesh model and any associated models.

Empirical tests of the performance of a tracker such as the tracker of FIG. 1 found improved performance when the tracker is using a 3D model which has been shape calibrated for a particular instance of an object class as compared with using a generic 3D model of the object class. For example, performance was assessed with respect to pixel classification accuracy for a sequence of frames of hands of real subjects, where each pixel is labelled in advance with one of 7 possible labels (5 fingers, the palm and the forearm). The tracker was found to give improved pixel classification accuracy when it used a shape calibrated 3D hand model. For example, a tracker using a template model (with no calibration) was found to track about 10% of the frames with 20% of pixels classified correctly. Where calibration was used, around 25% of frames were tracked with 20% of pixels classified correctly.

Figure 3:
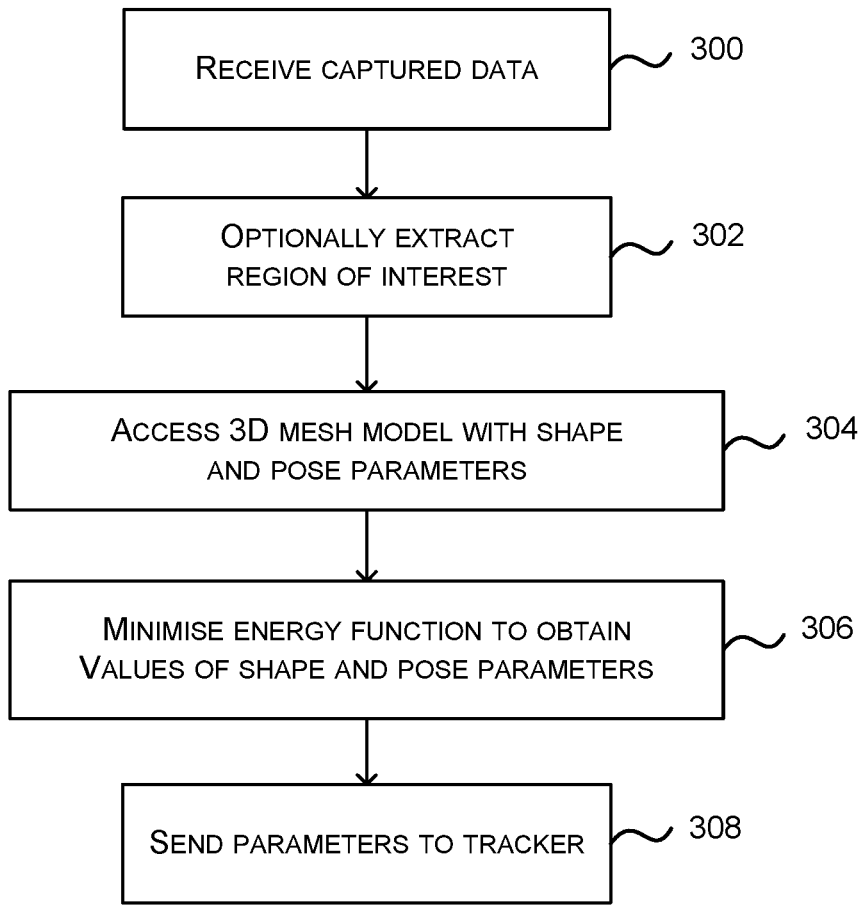
FIG. 3 is a flow diagram of a method of operation at a calibration engine.

A detailed example of operation 306 of FIG. 3 is now given. However, this is one example only and it may be modified as described above and is not intended to limit the scope of the technology.

The energy function mentioned above is modified to add a pose prior energy term and to make it more suited for an optimization process where derivatives are computed. Also, in some examples the calibration engine receives a plurality of frames F of captured sensor data, and for each frame f there is an associated set of pose parameter values (which are set to default values, or are set to values obtained from another source such as a tracking using a generic shape). In an example, the energy function is expressed as:

$$E'(\Theta, \beta) = \Sigma_{f=1}^{F} E_{gold}(\theta_f, \beta) + \lambda_{prior} E_{prior}(\theta_f)$$

where $\Theta = \{\theta_f\}_{f=1}^{F}$.

Which is expressed in words as, a lifted energy function E' over F frames of captured sensor data and shape parameters of the 3D model is equal to the sum over the F frames, of the golden energy plus a weighted pose prior energy. It is recognized that this is difficult to optimize using a stochastic optimizer because of the large number of parameters of the Energy function (the number of parameters comprises the number of shape parameters, times the number of frames F plus the number of shape space dimensions K). A Levenberg-Marquardt optimizer is used as now described.

A full Jacobian matrix J of the residuals (differences between the rendered model surface points and the captured data points) is formed with respect to the parameters of the energy function. In an example, columns of a Jacobian matrix are sparsely filled by the result of a pixel-wise derivative of the golden energy from a single image with respect to a pose parameter. This is combined with a Jacobian matrix of the pose prior energy, where the derivatives with respect to the global translation and rotation are zero. The shape coefficients are the same for all images and so a column that corresponds to the shape coefficient in the Jacobian matrix is the concatenation of the pixel-wise derivative of the golden energy from all images. The derivative of the pose prior energy is zero with respect to these shape coefficients.

Using the Levenberg-Marquardt method, the following update of the parameters $x = \{\Theta, \beta\}$ is carried out:

$$x^{prop} = (x - (J^T J + \gamma \text{diag}(J^T J))^{-1} J^T r)$$

Where $J^T J$ is a sparse matrix. If $E(x^{prop}) < E(x)$ then the update is accepted $x \leftarrow x^{prop}$ and the damping is decreased $\gamma \leftarrow 0.1\gamma$. Otherwise, the damping is increased $\gamma \leftarrow 10\gamma$ and the proposal is recalculated.

The calibration engine computes derivatives of the golden energy to put into the Jacobian matrix. However, as mentioned above the golden energy function is only piecewise continuous as moving occlusion boundaries cause jumps in the value of rendered data points. Thus the exact derivative of the golden energy at a given point will generally not be helpful. An approach to address this would be to rewrite the golden energy function mentioned above in a continuous form. However, this approach involves significantly more computational expense because it is not possible to use a render computed on a graphics processing unit.

A method which is implemented using graphics processing unit accelerated rendering techniques is now described. This method is also implementable without using graphics processing unit accelerated rendering techniques. The golden energy function is approximated (using finite differences) locally by fitting a line to two points that are sufficiently far from each other as to capture the dominant smooth behavior of the energy. In this way the gradient is approximate using:

$$\frac{\partial E_{gold}(\phi)}{\partial \phi_k} \approx \frac{E_{gold}\left(\phi + \frac{\Delta_k}{2}\right) - E_{gold}\left(\phi - \frac{\Delta_k}{2}\right)}{\epsilon_k}$$

Where the constant step size $\epsilon_k$ is set empirically and the value of the $k^{th}$ element of the vector $\Delta_k \in \mathbb{R}^{28+K}$ is set to $\epsilon_k$ while zero elsewhere. The symbol $\phi$ denotes a matrix formed from the transpose of the pose parameters and the shape parameters. In a similar way a central difference with a large step size allows approximation of the derivative of the residual (where the residual is described earlier in this document). The step size varies depending on the application domain and the type of sensor data and is determined empirically.

Unexpectedly, it is found that the approximate derivatives mentioned above work quite robustly resulting in few rejected steps. In addition the use of Levenberg-Marquardt in combination with the approximate derivatives provides a safeguard against stalling of the calibration engine. This is because when steps fail, the Levenberg-Marquardt algorithm implicitly performs a back-tracking line search and is able to recover.

When performing a finite difference with respect to transformation parameters, zero pixel residuals sometimes occur. Thus without the pose prior J and $J^T$ become rank-deficient. By including the pose prior, the angles of the occluded joints approach the conditional mean of the occluded joints given the visible joints as they remain unobserved by the image.

Figure 5:
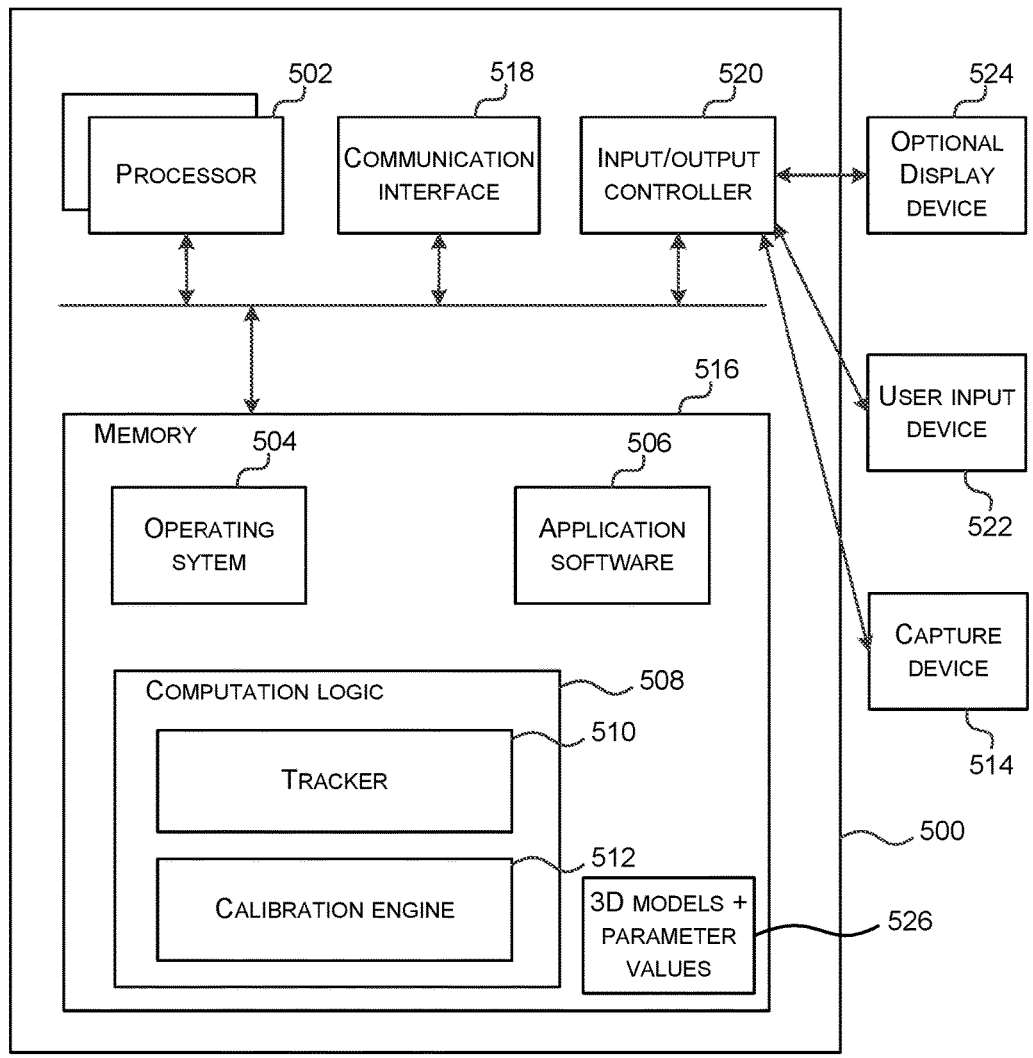
FIG. 5 illustrates an exemplary computing-based device in which embodiments of a calibration engine and optionally a tracker may be implemented.

FIG. 5 illustrates various components of an exemplary computing-based device 500 which is implemented as any form of a computing and/or electronic device, and in which embodiments of a calibration engine and/or tracker are implemented.

Computing-based device 500 comprises one or more processors 502 which are microprocessors, controllers or any other suitable type of processors for processing computer executable instructions to control the operation of the device in order to compute values of shape parameters of a 3D mesh model, or to track pose of a calibrated 3D model. In some examples, for example where a system on a chip architecture is used, the processors 502 may include one or more fixed function blocks (also referred to as accelerators) which implement a part of the method of computing values of shape parameters and/or tracking pose of an articulated object in hardware (rather than software or firmware). Platform software comprising an operating system 504 or any other suitable platform software is optionally provided at the computing-based device to enable application software 506 to be executed on the device. Computation logic 508 at memory 516 comprises a tracker 510 and a calibration engine 512. The calibration engine 512 is configured to compute values of shape parameters of a 3D mesh model of an articulated object from captured sensor data as described above. The tracker is configured to compute values of pose parameters of a model of an articulated object from captured sensor data. The memory 516 stores one or more 3D models such as a 3D mesh model of an articulated object, a rigged smooth-surface model of an articulated object, and one or more parameter values.

The computer executable instructions are provided using any computer-readable media that is accessible by computing based device 500. Computer-readable media may include, for example, computer storage media such as memory 516 and communications media. Computer storage media, such as memory 516, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 516) is shown within the computing-based device 500 it will be appreciated that the storage may be distributed or located remotely and accessed via a network or other communication link (e.g. using communication interface 518).

The computing-based device 500 also comprises an input/output controller 520 arranged to output display information to a display device 524 which is separate from or integral to the computing-based device 500. The display information may provide a graphical user interface. The input/output controller 520 comprises an input configured to receive and process input from one or more devices, such as a user input device 522 (e.g. a mouse, keyboard, camera, microphone or other sensor), display device 524 and capture device 514. The capture device 514 is an example of the capture device 108 of FIG. 1 The input is any type of input able to receive sensor data from the capture device 514 such as a wired communications input port, a wireless communications receiver, a digital versatile disc drive, a universal serial bus (USB) port, or other input. In some examples the user input device 522 detects voice input, user gestures or other user actions and provides a natural user interface (NUI). For example, using data computed by the tracker 510. In an embodiment the display device 524 also acts as the user input device 522 if it is a touch sensitive display device. The input/output controller 520 may also output data to devices other than the display device, e.g. a locally connected printing device.

Any of the input/output controller 520, display device 524 and the user input device 522 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (electro-encephalogram (EEG) and related methods).

Examples describe an apparatus for calibrating a 3D mesh model of an articulated object which is an instance of a specified object class comprising:

an input configured to receive captured sensor data depicting the object;

a calibration engine configured to compute values of shape parameters of the 3D mesh model which indicate which member of the object class is depicted in the captured sensor data, in order to calibrate the 3D mesh model;

the calibration engine configured to compute the values of the shape parameters with an optimization process to find at least one potential local or global minimum of an energy function, the energy function expressing a degree of similarity between data rendered from the model and the received sensor data.

For example, the shape parameters are included in the energy function jointly with pose parameters.

For example, the calibration engine is configured to compute the optimization process by computing derivatives of the energy function.

For example, the calibration engine is configured to compute the optimization process where the energy function is non-smooth.

For example, the calibration engine is configured to compute the optimization process using finite differences.

For example, the calibration engine is configured to use a differentiable renderer.

For example, the calibration engine is configured to minimize the energy function where the energy function includes a pose prior.

For example, the calibration engine is configured to minimize the energy function where the energy function includes a sum of squared differences penalty.

For example the input is configured to receive a plurality of instances of captured sensor data depicting the object in different poses and wherein the calibration engine is configured to jointly infer the shape parameters across the plurality of instances of the captured sensor data.

For example the mesh model comprises a combination of an articulated skeleton and a mapping from shape parameters to mesh vertices.

For example the mesh model comprises a model of a human hand.

For example the apparatus comprises a tracker arranged to compute pose parameters of a rigged smooth-surface model of the articulated object, corresponding to the mesh model, and using the shape parameters.

In examples the tracker is configured to compute the pose parameters by fitting the captured sensor data to the rigged smooth-surface model after the shape parameters have been applied to the rigged smooth-surface model.

In examples the calibration engine is configured to operate during operation of the tracker.

In examples the apparatus comprises an output arranged to display a request for calibration data, being captured sensor data of the articulated entity, and where the calibration engine is configured to use the calibration data to compute the shape parameters.

In various examples there is a method of calibrating a 3D mesh model of an articulated object which is an instance of a specified object class comprising:

receiving captured sensor data depicting the object;

computing values of shape parameters which indicate which member of the object class is represented, in order to calibrate the 3D mesh model;

wherein computing the values of the shape parameters comprises using an optimization process to find at least one potential local or global minimum of an energy function, the energy function expressing a degree of similarity between data rendered from the model and the received sensor data.

In some examples, the method in the paragraph above includes shape parameters in the energy function jointly with pose parameters.

Examples of the method compute the optimization process by computing derivatives of the energy function.

Examples of the method compute the optimization process where the energy function is non-smooth.

In an example there is an apparatus for calibrating a 3D mesh model of an articulated object which is an instance of a specified object class comprising:

an input configured to receive captured sensor data depicting the object;

a calibration engine configured to compute values of shape parameters of the 3D mesh model which indicate which member of the object class is depicted in the captured sensor data, in order to calibrate the 3D mesh model;

the calibration engine configured to compute the values of the shape parameters and values of pose parameters of the model with an optimization process to find at least one potential local or global minimum of an energy function, the energy function expressing a degree of similarity between data rendered from the model and the received sensor data.

In various examples there is a method of calibrating a 3D mesh model of an articulated object which is an instance of a specified object class comprising:

means for receiving captured sensor data depicting the object;

means for computing values of shape parameters which indicate which member of the object class is represented, in order to calibrate the 3D mesh model;

wherein the means for computing the values of the shape parameters uses an optimization process to find at least one potential local or global minimum of an energy function, the energy function expressing a degree of similarity between data rendered from the model and the received sensor data.

For example, the means for receiving captured sensor data is a wired communications port of a computer, or a wireless receiver.

For example, the means for computing values of shape parameters is a calibration engine as described herein.

The term 'computer' or 'computing-based device' is used herein to refer to any device with processing capability such that it is capable of executing instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants and many other devices.

In some examples, the methods described herein are performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are sometimes distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus for calibrating a three dimensional mesh model of an articulated object which is an instance of a specified object class, the apparatus comprising:
a processor configured to act as:
an input configured to receive captured sensor data depicting the object;
a calibration engine configured to compute values of shape parameters of the three dimensional mesh model which indicate which member of the object class is depicted in the captured sensor data, in order to calibrate the three dimensional mesh model;
the calibration engine configured to compute the values of the shape parameters with an optimization process to find at least one potential local or global minimum of an energy function, the energy function expressing a degree of similarity between data rendered from the three dimensional mesh model and the received sensor data; and
the calibration engine configured to compute the optimization process by computing derivatives of the energy function, wherein the optimization process includes a back-tracking search.

2. The apparatus of claim 1 where the shape parameters are included in the energy function jointly with pose parameters.

3. The apparatus of claim 1 where the calibration engine is further configured to calibrate the three dimensional mesh model, the calibrated three dimensional mesh model representing an individualized three dimensional mesh model that corresponds to the object; and
wherein the processor is further configured to act as a tracker configured to track the object using the calibrated three dimensional mesh model.

4. The apparatus of claim 1 where the calibration engine is configured to compute the optimization process where the energy function is non-smooth.

5. The apparatus of claim 1 where the calibration engine is configured to compute the optimization process using finite differences.

6. The apparatus of claim 1 where the calibration engine is configured to use a differentiable renderer.

7. The apparatus of claim 1 where the calibration engine is configured to minimize the energy function where the energy function includes a pose prior energy.

8. The apparatus of claim 1 where the calibration engine is configured to minimize the energy function where the energy function includes a sum of squared differences penalty.

9. The apparatus of claim 1 where the input is configured to receive a plurality of instances of captured sensor data depicting the object in different poses and wherein the calibration engine is configured to jointly infer the shape parameters across the plurality of instances of the captured sensor data.

10. The apparatus of claim 1 where the mesh model comprises a combination of an articulated skeleton and a mapping from shape parameters to mesh vertices.

11. The apparatus of claim 1 where the mesh model comprises a model of a human hand.

12. The apparatus of claim 1 further comprising a tracker arranged to compute pose parameters of a rigged smooth-surface model of the articulated object, corresponding to the three dimensional mesh model, and using the shape parameters.

13. The apparatus of claim 12 the tracker configured to compute the pose parameters by fitting the captured sensor data to the rigged smooth-surface model after the shape parameters have been applied to the rigged smooth-surface model.

14. The apparatus of claim 12 the calibration engine configured to operate during operation of the tracker.

15. The apparatus of claim 1 comprising an output arranged to display a request for calibration data, being captured sensor data of the articulated entity, and where the calibration engine is configured to use the calibration data to compute the shape parameters.

16. A method of calibrating a three dimensional mesh model of an articulated object which is an instance of a specified object class comprising:
receiving captured sensor data depicting the object;
computing values of shape parameters which indicate which member of the object class is represented, in order to calibrate the three dimensional mesh model;
wherein computing the values of the shape parameters comprises using an optimization process to find at least one potential local or global minimum of an energy function, the energy function expressing a degree of similarity between data rendered from the three dimensional mesh model and the received sensor data; and
computing the optimization process by computing derivatives of the energy function, wherein the optimization process includes a back-tracking search.

17. The method of claim 16 comprising including shape parameters in the energy function jointly with pose parameters.

18. The method of claim 16 comprising:
calibrating the three dimensional mesh model, the calibrated three dimensional mesh model representing an individualized three dimensional mesh model that corresponds to the object; and
tracking the object using the calibrated three dimensional mesh model.

19. The method of claim 16 comprising computing the optimization process where the energy function is non-smooth.

20. An apparatus for calibrating a three dimensional mesh model of an articulated object which is an instance of a specified object class, the apparatus comprising:
a processor configured to act as:
an input configured to receive captured sensor data depicting the object;
a calibration engine configured to compute values of shape parameters of the three dimensional mesh model which indicate which member of the object class is depicted in the captured sensor data, in order to calibrate the three dimensional mesh model;
the calibration engine configured to compute the values of the shape parameters and values of pose parameters of the model with an optimization process to find at least one potential local or global minimum of an energy function, the energy function expressing a degree of similarity between data rendered from the three dimensional mesh model and the received sensor data;
the calibration engine further configured to compute the optimization process by computing derivatives of the energy function, wherein the optimization process includes a back-tracking search.

* * * * *